United States Patent [19]

Toyoshima et al.

[11] Patent Number: 5,512,955
[45] Date of Patent: Apr. 30, 1996

[54] TV RECEIVER FOR RECEIVING A BROADCAST SIGNAL AND STATION INFORMATION

[75] Inventors: Kenichiro Toyoshima; Hirofumi Usui, both of Tokyo, Japan

[73] Assignee: Sony Corporation, Tokyo, Japan

[21] Appl. No.: 366,354

[22] Filed: Dec. 29, 1994

[30] Foreign Application Priority Data

Dec. 31, 1993 [JP] Japan ..................... 5-350425

[51] Int. Cl.⁶ ..................... H04N 5/50
[52] U.S. Cl. ..................... 348/569; 348/731
[58] Field of Search ..................... 348/731–734, 348/558, 569, 906; H04N 5/50

[56] References Cited

U.S. PATENT DOCUMENTS

| | | | |
|---|---|---|---|
| 4,706,121 | 11/1987 | Young | 358/142 |
| 4,959,720 | 9/1990 | Duffield et al. | 348/731 |
| 5,191,423 | 3/1993 | Yoshida | 348/569 |
| 5,315,392 | 5/1994 | Ishikawa et al. | 348/734 |

FOREIGN PATENT DOCUMENTS 2258573A  2/1993  United Kingdom ............ H04N 5/50

*Primary Examiner*—Victor R. Kostak
*Attorney, Agent, or Firm*—Peter C. Toto; Jerry A. Miller

[57] ABSTRACT

A method for entering channel representative information provided by a broadcasting signal that has been received by a television signal receiving apparatus and setting a plurality of channels in response thereto is disclosed. The method includes a first step for initiating channel setting by a CPU contained in a television signal receiving apparatus in response to an initiating signal; a second step for setting a start channel number in a counter; a third step for selecting a channel from the broadcast signal in accordance with the channel number in the counter; a fourth step for judging whether the selected channel is an active channel; a fifth step for extracting an information signal from the selected channel if the selected channel has been judged active in the prior step; and a sixth step for writing information represented by the information signal and the channel number of the selected channel to a memory.

10 Claims, 8 Drawing Sheets

TV RECEIVER FOR RECEIVING A BROADCAST SIGNAL AND STATION INFORMATION

BACKGROUND OF THE INVENTION

1. Field of the Invention

This invention relates to a television signal receiving apparatus, and more particularly to an improved television signal receiving apparatus which constructs a character information system utilizing information such as a broadcasting station's name.

2. Description of the Related Art

Heretofore, in a television signal receiving apparatus, as a method to set or change a broadcasting channel to be received, out of a plurality of broadcasting channels, an up-down type of operation key is employed, resulting in a receiving channel being changed in accordance with a previously entered sequence or the reverse of that sequence.

In addition to this method, there is another method to change the receiving channel, wherein some character information such as broadcasting stations' names are displayed on the screen, and then, via operation of a key on a remote control device (,and/or an operation key connected to the television receiver) corresponding to the position of the desired channel or the display, the receiving channel is changed.

The technique which superimposes information on the television signal to display the character information signal is disclosed in the European Patent Application No. 94306167.1 (which is applying to the U.S. Patent Office at present).

However, in a television signal receiving apparatus thus constructed, character information such as a broadcasting station's name which corresponds to the selected receiving-channel is required to be displayed on the display screen. In this case, the user has to remember or look up the suitable character information (broadcasting station's name etc.) for each channel and then enter it one character at a time. Accordingly there has been a problem that a complicated operation is not avoidable.

SUMMARY OF THE INVENTION

In view of the foregoing, an object of this invention is to provide a television signal receiving apparatus adapted to enter information such as broadcasting stations' names etc. in a substantially simple manner.

With reference to FIG. 1, the foregoing object and other objects of the invention have been achieved by the provision of a television signal receiving apparatus which includes: receiving means 1 for receiving an information signal SG which has been multiplexed onto the prescribed broadcasting wave SRF1, SRF2 and transmitted; analyzing means 5 for analyzing the information signal SG and for extracting the prescribed information; memory means 9 for storing the information extracted by the analyzing means 5; displaying means 13 for displaying the information; and selecting means 30 for selecting the desired channel out of a plurality of broadcasting channels which are transmitted as the broadcasting wave SRF1, SRF2, based on the information which has been displayed on the displaying means 13. The information which has been obtained based on the information signal SG is stored in the memory means 9, hereby the broadcasting channels are selected utilizing the information which is displayed on the displaying means 13.

Further, in this invention, the broadcasting wave SRF1, SRF2 are carried via air or cable.

Further, in this invention, the information can be received via a channel for information offering only.

As described above, according to this invention, receiving means for receiving a coded information signal which is sent from the broadcasting station, analyzing means for analyzing the information signal and for extracting the character information etc., memory means storing the character information etc., displaying means for displaying the character information etc., and composite channel operating means for operating channels while the information such as the broadcasting station's name is being displayed are comprised. The character information etc. which have been obtained from the information signal are stored in the memory means, thereby providing that the information entry for utilizing the composite channel operating means which uses the screen displaying can be automatically performed.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
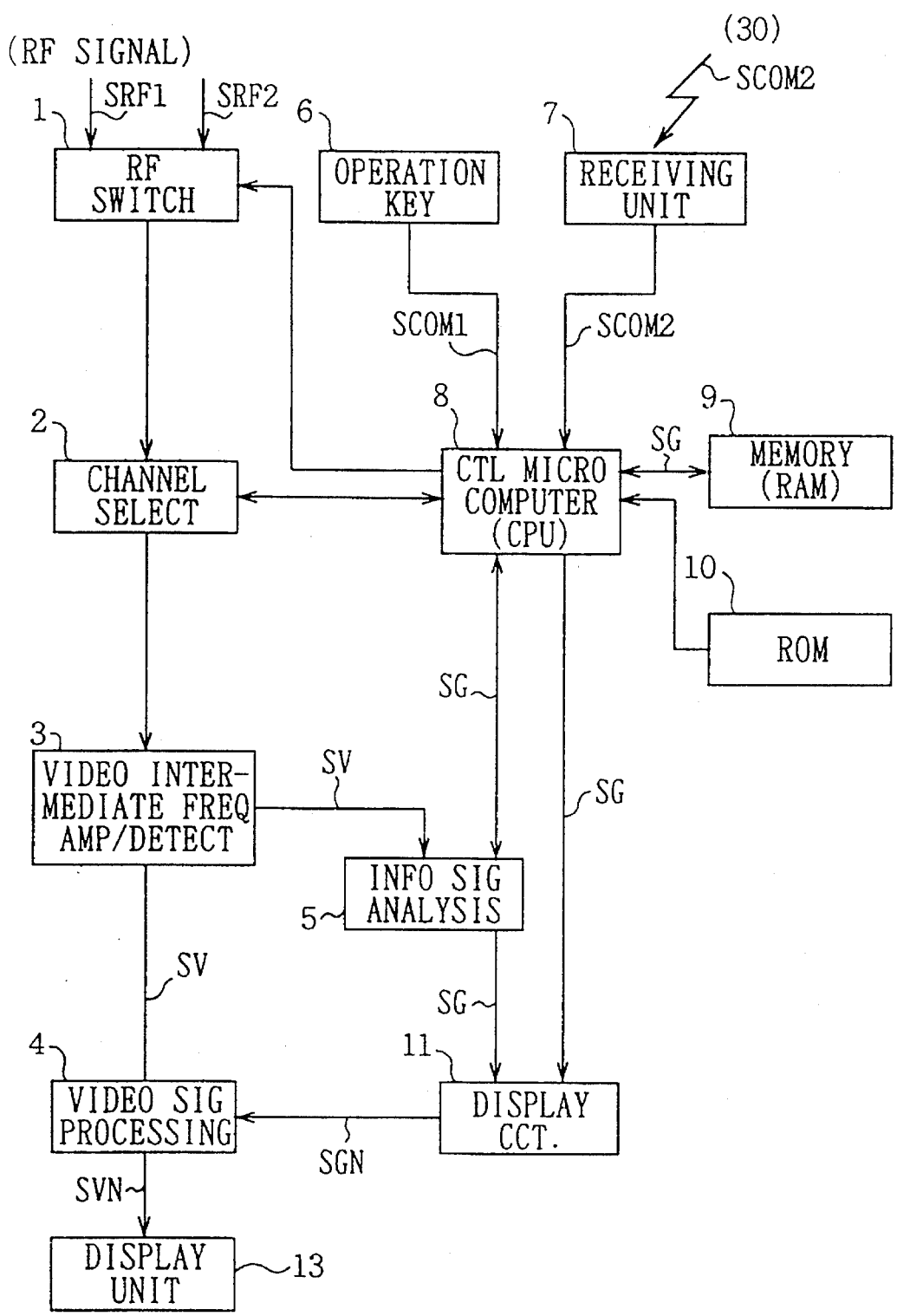
FIG. 1 is a block diagram showing the television signal receiving apparatus according to this invention.

Preferred embodiments of this invention will be described with reference to the accompanying drawings. Referring to FIG. 1, a television signal receiving apparatus is generally designated by the reference numeral 20. A broadcasting wave of space transmission (RF-signal SRF1) or a broadcasting wave of cable transmission (RF-signal SRF2) is switched to be inputted in an RF switch circuit 1 which is controlled by a controlling micro-computer (CPU) 8. The selected and inputted RF signal (SRF1 or SRF2) is sent to a channel selection circuit 2.

The channel selection circuit 2, which is controlled by the CPU 8, extracts a signal of the channel which has been selected by the user, and then sends it to a video intermediate frequency amplifying/detecting circuit 3 as an intermediate frequency signal. The video intermediate frequency amplifying/detecting circuit 3 generates a video signal SV, and then sends this signal to an information signal analyzing circuit 5 and a video signal processing circuit 4.

The information signal analyzing circuit 5 extracts an information signal SG from the video signal SV, and transforms this signal SG into such a data type that can be processed at a display circuit 11, and then sends it to the display circuit 11. At the same time, the information signal analyzing circuit 5 sends the information signal SG to the CPU 8, and the CPU 8 in turn writes the information signal SG into a memory (RAM) 9 as necessary.

The CPU 8 receives a command signal SCOM2 sent from a remote commander via a receiving unit 7 and a command signal SCOM1 from an operation key 6. Whereupon, the CPU 8 performs a control operation in accordance with the program obtained from a ROM 10, based on the command signal SCOM1 or SCOM2 which is obtained by virtue of a user's operation.

The display circuit 11 is controlled by the CPU 8. The circuit 11 generates an information signal SGN which can be multiplexed onto the video signal SV, based on the information signal SG which is outputted front the CPU 8 or based on the information signal SG which is outputted front the information signal analyzing circuit 5, and then sends this signal SGN to the video signal processing circuit 4.

The video signal processing circuit 4 superimposes the information signal SGN which is outputted from the display circuit 11 on the video signal SV which is outputted from the video intermediate frequency amplifying/detecting circuit 3, performs other video-processing, and then outputs this to the display unit (CRT) 13 as a displaying video signal SVN.

Thus, the television signal receiving apparatus 20 is adapted to write the information into the memory 9 using the CPU 8, in which the information is extracted from the information signal SG which has been coded and multiplexed onto the broadcasting signal (SRF1, SRF2), or from the information signal SG which has been sent through the information dedicated channel.

Further, the television signal receiving apparatus 20 is adapted to utilize this information so as to automatically enter display data to the memory 9, the display data is needed to perform a composite channel operation in which the channels are operated or selected while displaying information such as broadcasting station's name.

Generally, the channel setting of the television signal receiving apparatus 20 is performed by the CPU 8, through a controlling of the channel selection circuit 2.

Figure 2:
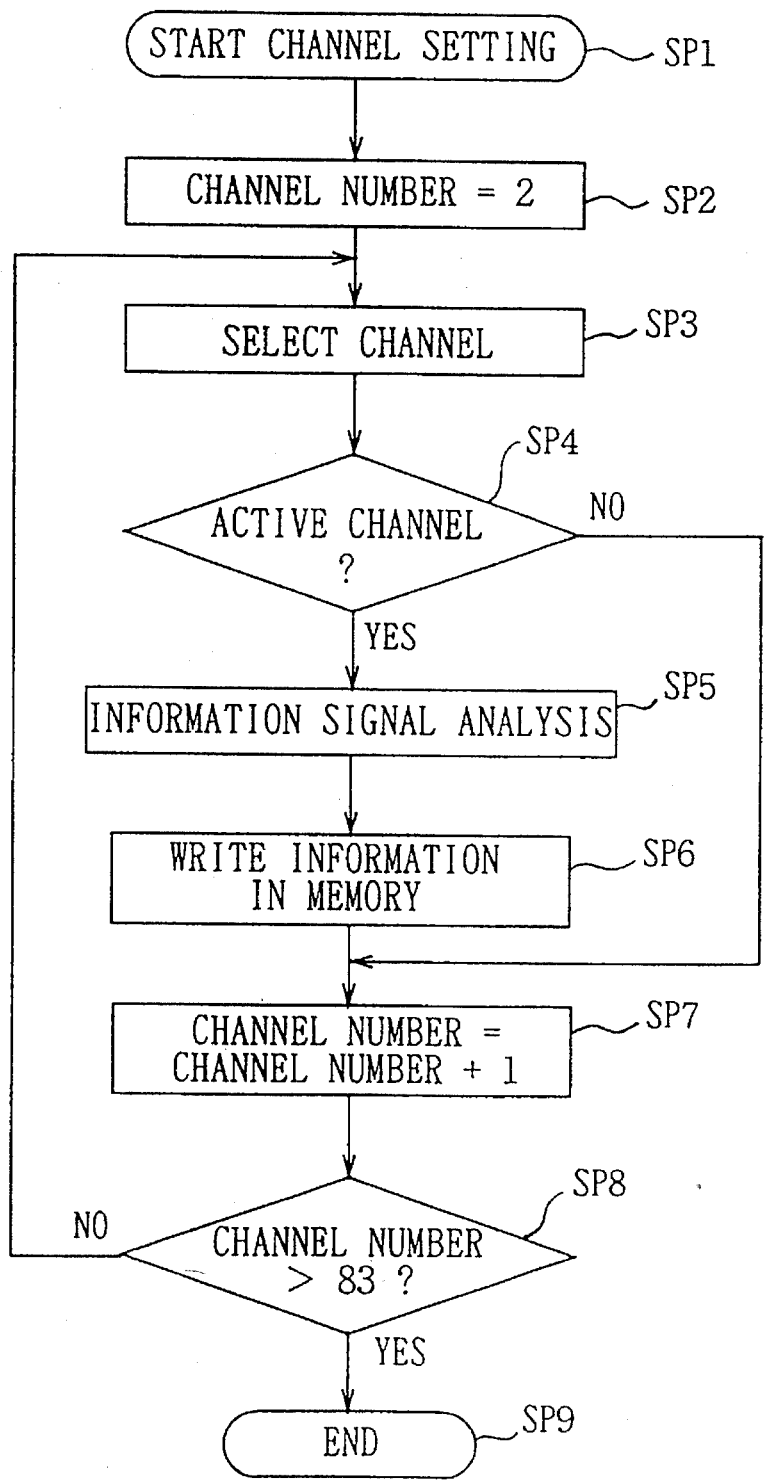
FIGS. 2 and 3 are flow charts showing the procedure for information analysis in the channel setting mode.

Referring now to FIG. 2, the channel setting and analysis procedure in the case where an air transmission broadcasting wave SRF1 has been received is shown. The CPU 8 starts the channel setting at step SP1, and then sets the starting channel (for instance, "2") in the counter according to the present input signal at the succeeding step SP2.

Further, the channel selection is performed in accordance with the channel number which is shown by the counter, at the succeeding step SP3. An AFT signal etc. of the received signal is monitored, and the presence of a signal S (in other words, whether it is an active channel or not) is judged at step SP4.

If an affirmative result is obtained at SP4, tile CPU 8 proceeds to the succeeding step SP5 and receives the information signal SG from the information signal analyzing circuit 5. At step SP6, the CPU 8 writes the information of the information signal SG along with the channel number to the memory 9, and then proceeds to the succeeding step SP7.

On the contrary, if a negative result is obtained at step SP4, this means that the signal which is being received is not a significant channel, the CPU 8 then proceeds to step SP7.

At step SP7, the CPU 8 increments the channel number by adding "1" to the value of the counter. Then, the CPU 8 proceeds to step SP8, and judges whether the present channel number is more than the maximum value "83" or not. If a negative result is obtained, it returns to the above-mentioned step SP3 and repeats similar processes. If an affirmative result is obtained, it proceeds to step SP9 and terminates the processing.

Figure 3:
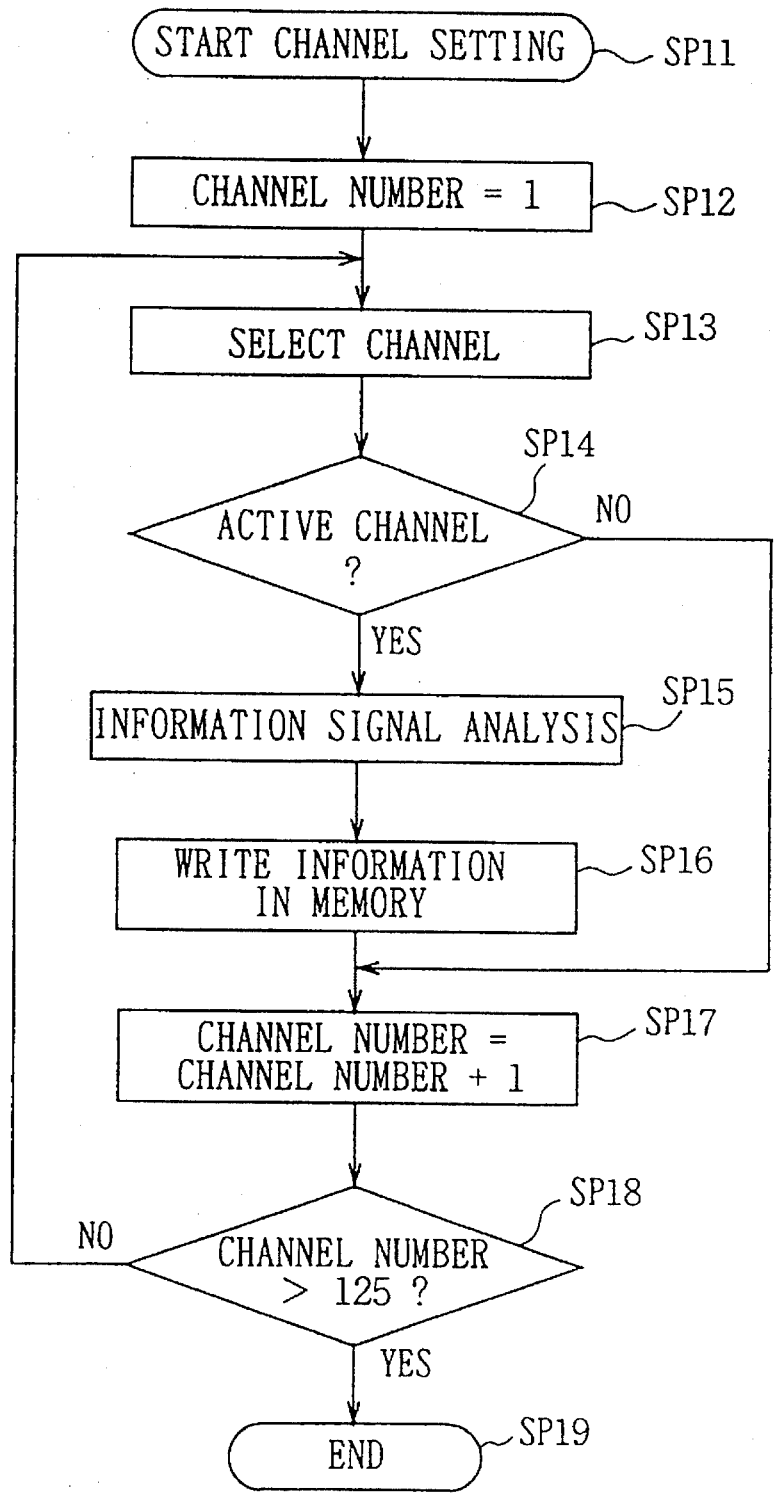

On the other hand, FIG. 3 shows the steps of procedure for extracting the information signal SG from cable transmission broadcasting wave SRF2 and for writing this signal SG in the memory 9. The CPU 8 starts the channel setting at step SP11, and then sets the starting channel (for instance, "1") in the counter according to the present input signal at the succeeding step SP12.

Further, the channel selection is performed in accordance with the channel number which is shown by the counter at the succeeding step SP13. An AFT signal etc. of the received signal is monitored, and the presence of a signal S (in other words, whether it is an active channel or not) is judged at step SP14.

If an affirmative result is obtained at SP14, the CPU 8 proceeds to the succeeding step SP15 and receives the information signal SG from the information signal analyzing circuit 5. At step SP16, the CPU 8 writes the information of the information signal SG along with the channel number to the memory 9, and then proceeds to the succeeding step SP17.

On the contrary, if a negative result is obtained at step SP14, this means that the signal which is being received is not a significant channel, the CPU 8 then proceeds to step SP17.

At step SP17, the CPU 8 increments the channel number by adding "1" to the value of the counter. Then, the CPU 8 proceeds to step SP18, and judges whether the present channel number is more than the maximum value "125" or not. If a negative result is obtained, it returns to the above-mentioned step SP13 and repeats similar processes. If an affirmative result is obtained, it proceeds to step SP19 and terminates the processing.

Figure 4:
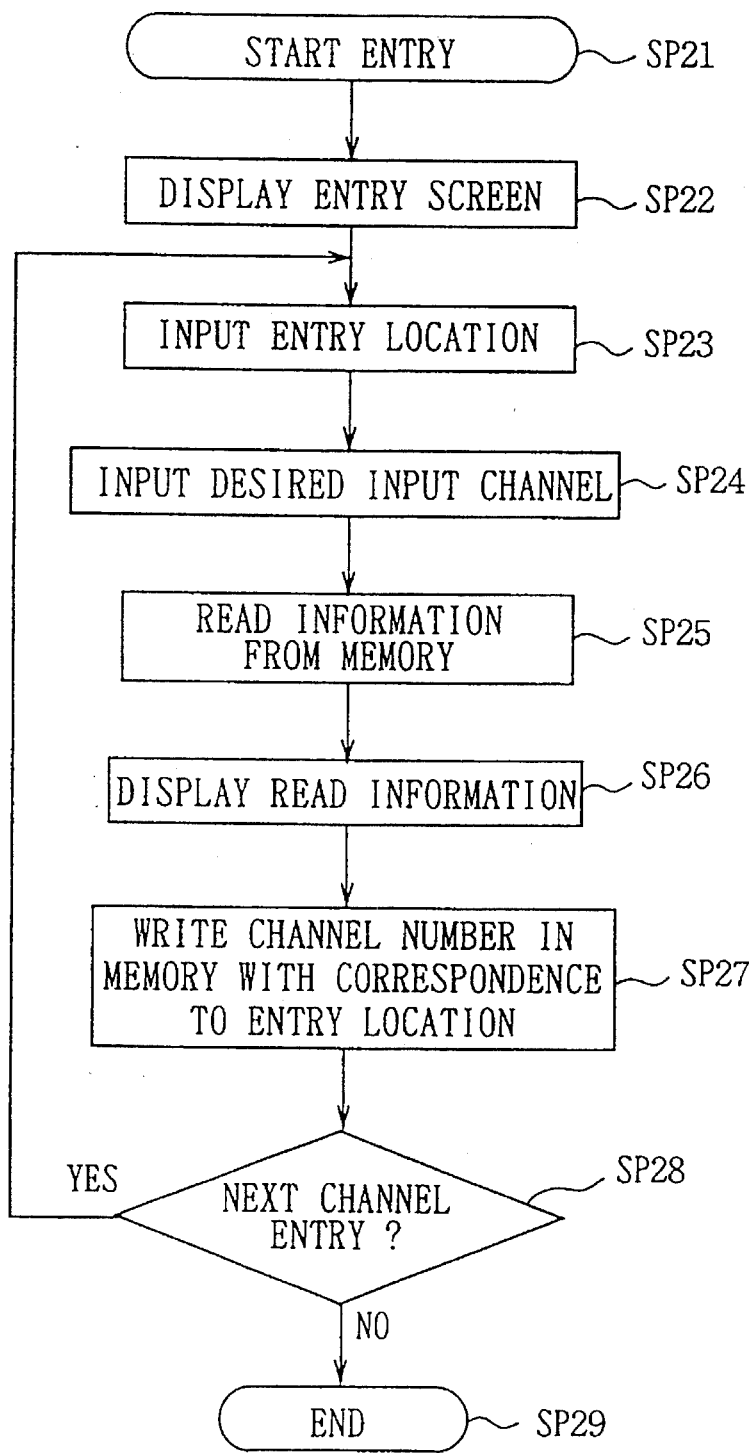
FIG. 4 is a flow chart showing the procedure of the information entry.

To utilize the composite channel-operating function which uses the CPU 8 and accompanies the displaying of the broadcasting station's name etc., it is required to enter the displaying data such as the broadcasting station's name in advance of usage. Therefore, in this case, the CPU 8 commences the entry processing shown in FIG. 4 at step SP21.

Figure 5:
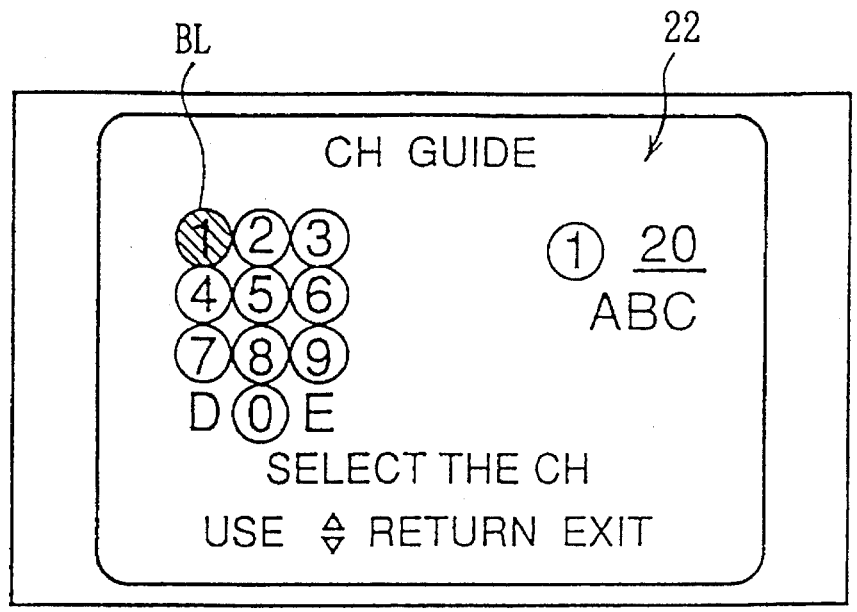
FIG. 5 is a schematic diagram showing the display screen in an information entry mode.

In other words, the CPU 8 displays the entry screen 22 shown in FIG. 5 on the display screen of the display device at step SP22. The intensity of the number which has been specified by the user via the remote commander is changed on the entry screen 22. The user inputs the entry location and the channel number which is intended to be entered while looking at the entry screen 22 (steps SP23 and SP24).

When the user has inputted the channel number at step SP24, the CPU 8 proceeds to step SP25 and reads the information (information signal SG) such as the broadcasting station's name, which has been previously written to the memory 9 during the time of the channel setting, and then displays the information which has been read on the display screen at step SP26.

At the succeeding step SP27, the CPU 8 writes the channel number in the memory address of the memory 9 which corresponds to the entry location, and then, at step SP28, judges whether the entry (the registration) has been successively performed. If an affirmative result is obtained, it returns to the above-mentioned step SP23 and repeats similar processes. If a negative result is obtained, it proceeds to step SP29 and terminates the processing.

Figure 7:
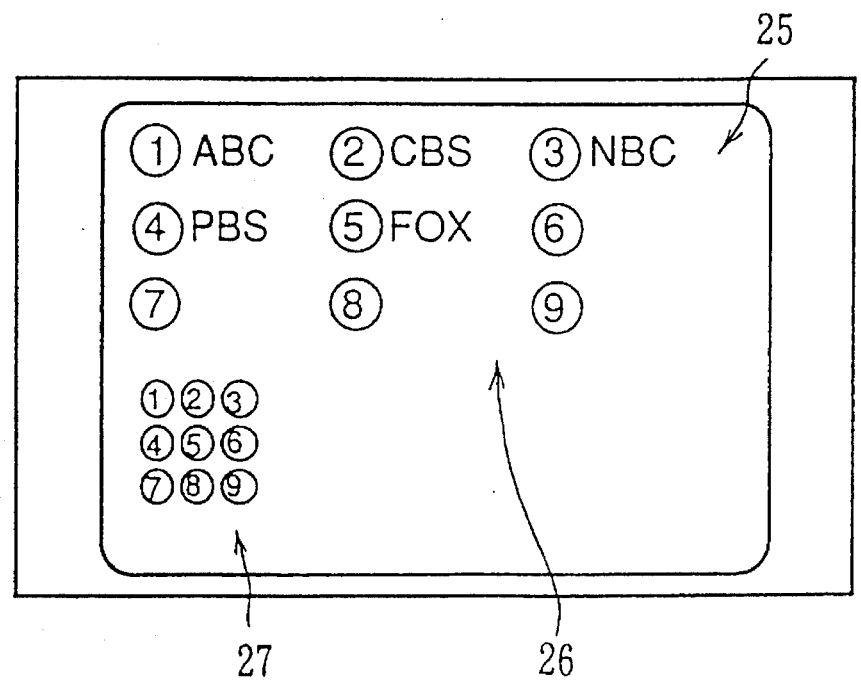
FIG. 7 is a schematic diagram showing the display screen in channel selection mode.
Figure 6:
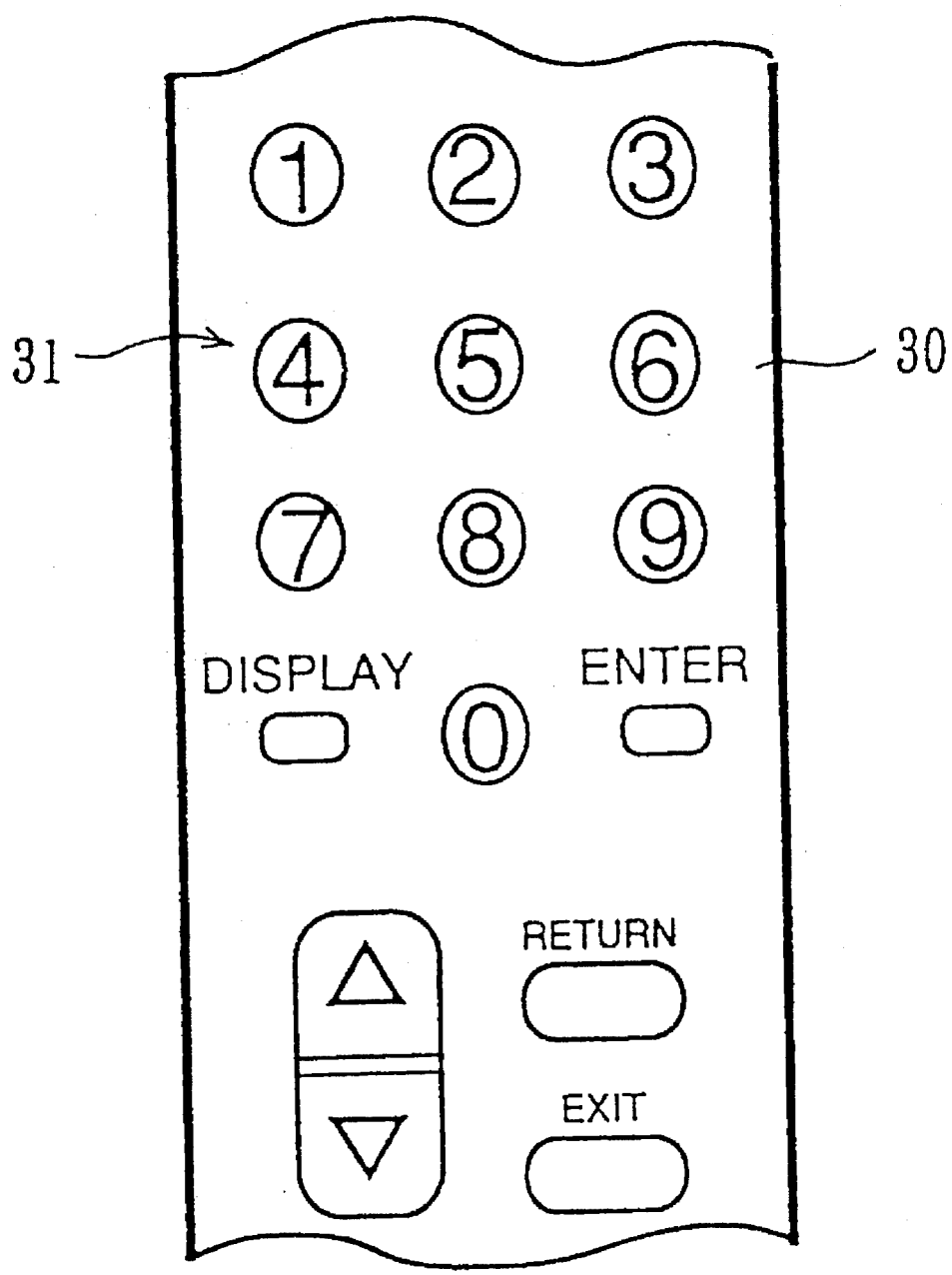
FIG. 6 is a schematic diagram showing the lay out of a remote commander for use with the present invention.

In the case where the composite channel-operating function etc. which uses the CPU 8 and accompanies the displaying of the broadcasting station's name etc. is utilized, the channel selecting screen 25 as shown in FIG. 7 is displayed on the display screen of the display unit. In this case, the user specifies the number which corresponds to the broadcasting station's name by pushing the number key 31 of the remote commander shown in FIG. 6 while looking at the display region 26 of the channel selecting screen 25 wherein broadcasting station's names etc. and the numbers corresponding to them are displayed. In this connection, the numbers which are displayed on the number display region 27 of the channel selecting screen 25 are adapted to be displayed in such a manner that they correspond to the operation keys 31 of the remote commander 30.

Figure 8:
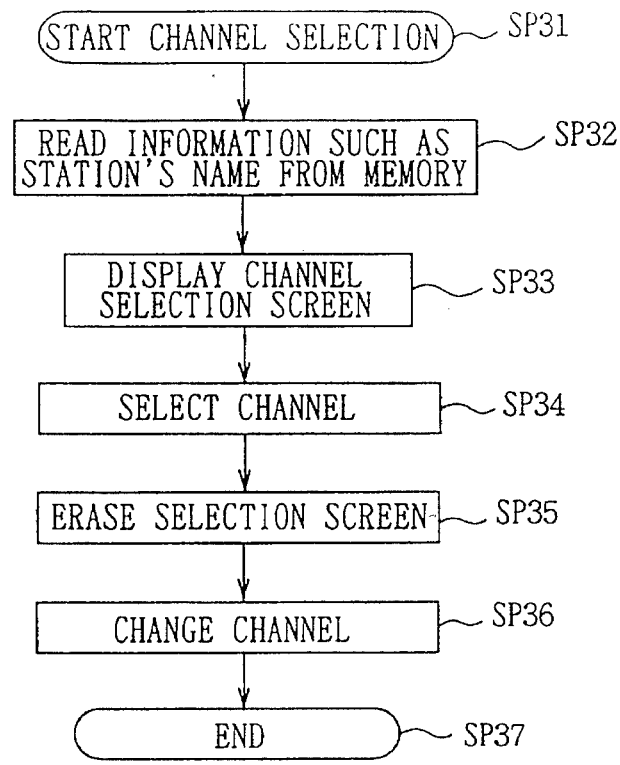
FIG. 8 is a flow chart showing the procedure for channel selection.

FIG. 8 shows the channel selection procedure. The CPU 8 enters the channel selection procedure at step SP31, and reads the information such as the broadcasting station's name from the memory 9 etc. at step SP32, and displays the channel selecting screen 25 (FIG. 7) on the display screen at step SP33.

The user specifies the channel number which corresponds to the broadcasting station's name by the use of the remote commander 30, while looking at the channel selecting screen 25. The CPU 8 is next given the result of the selection at step SP34, erases the channel selecting screen 25 from the display screen at the succeeding step SP35, then reads the specified channel number from the memory 9 and changes the channel by controlling the channel selecting device 2 at the succeeding step SP36, and then terminates the processing at step SP37.

To utilize the composite channel-operating function which uses the CPU 8 and accompanies the displaying of the broadcasting station's name etc., it is required to enter the displaying data such as the broadcasting station's name in advance of usage. Therefore, in the case where the analysis of the information signal has been performed during the time of the entry, the CPU 8 executes the entry process shown in FIG. 9.

Figure 9:
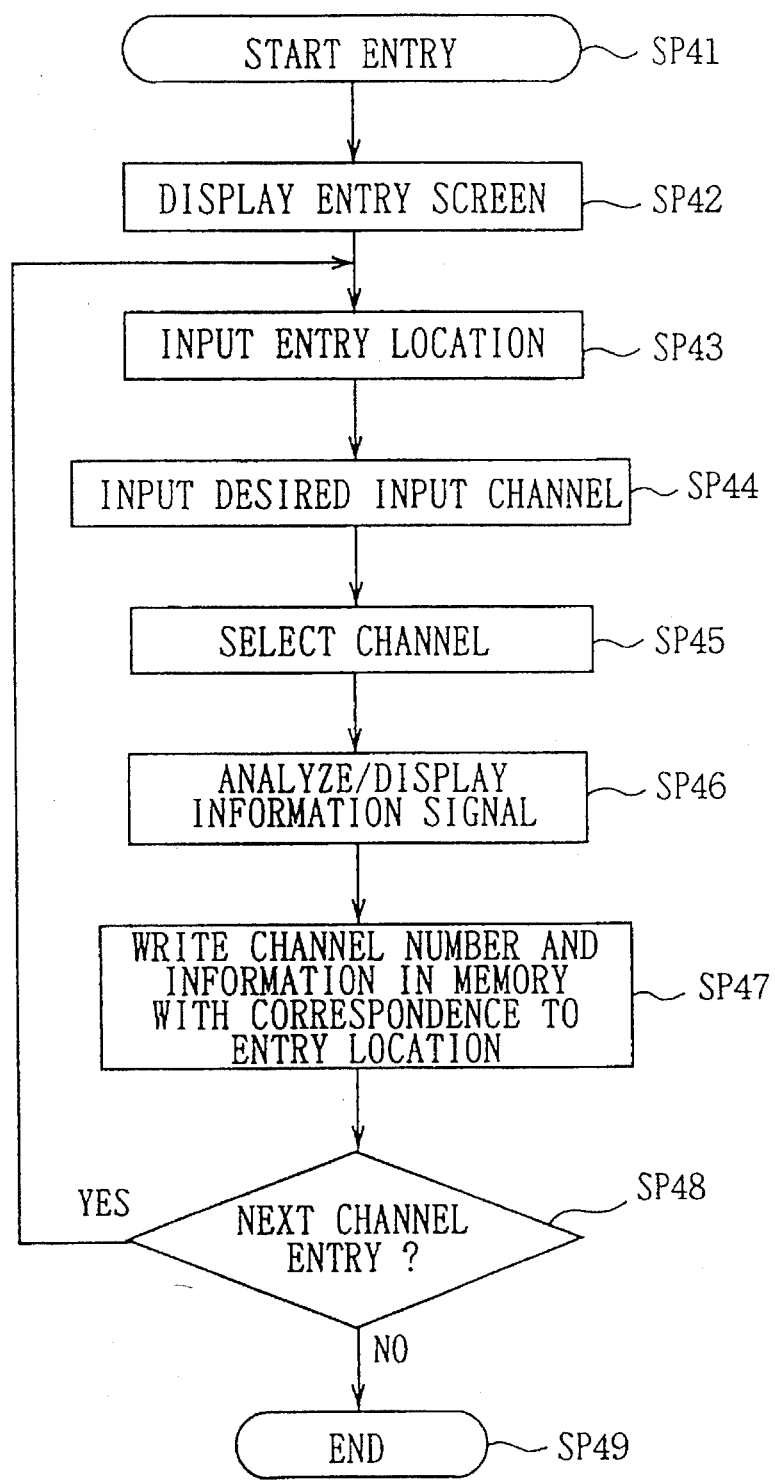
FIG. 9 is a flow chart showing the entry processing steps for channel entry.

Referring now to FIG. 9, the CPU 8 proceeds into the entry procedure at step SP41, and displays the entry screen 22 (FIG. 5) on the display screen of the display unit at step SP42. Then, the user specifies the entry location and the channel number which is intended to be entered, by the use of the remote commander 30 (FIG. 6), while he is looking at the entry screen 22. At the succeeding steps SP43 and SP44, the CPU 8 inputs the entry location and the channel number which is intended to be entered.

When the channel number has been specified by the user, the CPU 8 proceeds to step SP45 and performs the channel selection in accordance with the channel number. At the succeeding step SP46, it receives the information signal SG from the information signal analyzing circuit 5, and displays the information on the region which corresponds to the channel number which has been selected on the display screen.

In this state, the CPU 8 proceeds to step SP47 and writes the channel number along with the information into the address, which corresponds to the entry location of the memory 9. Then, it proceeds to step SP48 and judges whether the succeeding entry is to be performed or not.

If an affirmative result is obtained in step SP48, the CPU 8 returns to the above-mentioned step SP43 and repeats a similar process. If a negative result is obtained, it proceeds to step SP49 and terminates the processing.

In this connection, as for the channel selecting process of the case where the analysis of the information signal has been performed during the time of entry, the same processing as the channel selection procedure which has been described with respect to FIG. 8 is performed.

Figure 10:
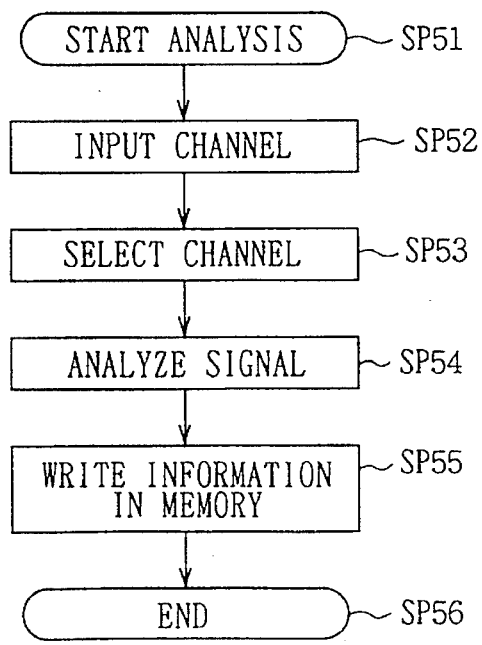
FIG. 10 is a flow chart showing the procedure for analysis when a channel for data only is utilized.

In the case where a data dedicated channel is utilized, the CPU 8 executes the analysis processing shown in FIG. 10. The CPU 8 enters the analysis processing at step SP51 of FIG. 10. At step SP52, it requires the number of the data dedicated channel. When the channel number has been inputted by the user's operation, the CPU 8 proceeds to the succeeding step SP53 and performs the channel selection in accordance with the inputted channel number.

At step SP54, the CPU 8 controls the prescribed information analyzing circuit and analyzes the coded information so as to transform it to the signal which can be processed by the CPU 8. Then, the CPU 8 proceeds to the succeeding step SP55 and writes the transformed information along with the channel number in the memory.

When the data which is to be processed has ended, the CPU 8 proceeds to step SP56 and terminates the analysis processing.

To utilize the composite channel-operating function etc. which uses the CPU 8 and accompanies the displaying of the broadcasting station's name etc., it is required to enter the displaying data such as the broadcasting station's name in advance of usage. In this case, the user performs the entry of the displaying data by the use of the remote commander 30 shown in FIG. 6 while looking at the entry screen 22 shown in FIG. 5.

As to the entry processing of the displaying data of the case where the channel for data only is utilized, the CPU 8 displays the entry screen 22 for the entry (FIG. 5), while the user inputs the entry location and the channel number which is intended to be entered according to the entry screen 22, in the same way as the entry procedure which has been described above with respect to FIG. 4.

At this point, the CPU 8 reads the information which corresponds to the inputted channel number from the memory 9, and then, based on the prescribed information, displays the information on the prescribed region of the entry screen 22, and also writes the channel number in the address, which corresponds to the entry location, of the memory 9.

These processes are performed sequentially, and the user operates the remote commander 30 according to the screen prompts until the end of the process wherein the CPU 8 terminates the entry processing. In this regard, as for the channel selection process in the case where the channel for data only is utilized, the same processing as the channel selection procedure which has been described with respect to FIG. 8 is performed.

In the above construction, the information extracted from the coded information signal which has been multiplexed onto the broadcasting signal etc. or from the information signal which has been transmitted through the information (data) dedicated channel is written into the memory 9 with the use of the CPU 8, and this information is utilized so that the displaying data required to perform the composite channel-operation which utilizes the display function can be automatically entered.

According to the above construction, in the television signal receiving apparatus 20 for receiving, analyzing, and displaying the broadcasting signal etc. on which the information signal such as the broadcasting station's name has been multiplexed, the information such as the broadcasting station's name can be automatically entered on the memory 9, by causing the memory to store the information which has been obtained through analyzing the information signal, in channel setting, in information entry, or in receiving the channel for information offering only (the channel for data only).

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A method for entering channel representative information provided by a broadcasting signal that has been received by a television signal receiving apparatus and setting a plurality of channels in response thereto, comprising:

a first step for initiating channel setting by a CPU contained in said television signal receiving apparatus in response to an initiating signal;

a second step for setting a start channel number in a counter;

a third step for selecting a channel from the broadcast signal in accordance with the channel number in the counter;

a fourth step for judging whether the selected channel is an active channel;

a fifth step for extracting an information signal from the selected channel if the selected channel has been judged active in the prior step; and a sixth step for writing information represented by the information signal and the channel number of the selected channel to a memory.

2. The method for entering channel representative information according to claim 1, further comprising:

a seventh step for incrementing the counter to increase the channel number;

an eighth step for judging whether or not the channel number exceeds a maximum value;

a ninth step for terminating channel setting by said CPU if the maximum value is exceeded in step eight or otherwise returning to step three.

3. The method for entering channel representative information according to claim 2, wherein step four further comprises:

skipping to step seven if the selected channel has been judged to be not active in step four.

4. The method for entering channel representative information according to claim 1, wherein said broadcasting signal has been transmitted through air.

5. The method for entering channel representative information according to claim 1, wherein said broadcasting signal has been transmitted via cable.

6. A method for entering display data wherein a composite channel-operating function is utilized in a television signal receiving apparatus, comprising:

a first step for initiating an entry process by a CPU contained in said television signal receiving apparatus in response to an initiating signal;

a second step for displaying an entry screen on a display screen of said television signal receiving apparatus;

a third step for receiving an entry location input via a remote commander by a user viewing the entry screen;

a fourth step for receiving a channel number input from the remote commander by the user viewing the entry screen;

a fifth step for reading information including a broadcasting station's name previously stored in a memory at a location corresponding to the channel number;

a sixth step for displaying the read information on the display screen;

a seventh step for writing the channel number to an address in the memory which corresponds to the entry location;

an eighth step for judging whether to enter the next channel; and a ninth step for returning to said third step to repeat the same processing if an affirmative result is obtained at said eighth step, or to otherwise terminate the processing.

7. A method for channel selection wherein a composite channel-operating function is utilized in a television signal receiving apparatus, comprising:

a first step for initiating channel selection by a CPU contained in said television signal receiving apparatus in response to an initiating signal;

a second step for reading information including a plurality of broadcasting stations' names previously stored in a memory in said television signal receiving apparatus;

a third step for displaying a channel selection screen on a display screen of said television signal receiving apparatus which includes said information;

a fourth step for obtaining a channel number corresponding to a desired broadcast station's name which has been specified by a user with a remote commander viewing the channel selection screen;

a fifth step for erasing the channel selection screen from the display screen;

a sixth step for reading the desired channel number from the memory and for controlling a channel selection device to change to the desired channel; and a seventh step for terminating the above method by said CPU.

8. A method for entering information represented by an information signal wherein a composite channel-operating function is utilized in a television signal receiving apparatus, comprising:

a first step for initiating entry by a CPU contained in said television receiving apparatus in response to an initiating signal;

a second step for displaying an entry screen on a display screen of said television signal receiving apparatus;

a third step for receiving an entry location specified by a user with a remote commander while viewing the entry screen;

a fourth step for receiving a channel number specified by the user with the remote commander while viewing the entry screen;

a fifth step for selecting the channel in accordance with the channel number;

a sixth step for receiving an information signal for the selected channel front an information signal analyzing circuit and displaying the information on a region of the display screen corresponding to the selected channel number;

a seventh step for writing the channel number and information represented by the information signal to an address in a memory located in said television signal receiving apparatus corresponding to the entry location; and an eighth step for judging whether to enter a next channel; and a ninth step for returning to step three if an affirmative result is obtained at said eighth step, or otherwise terminating said method.

9. A method for entering information represented by an information signal wherein a channel for data only is used in a television signal receiving apparatus, comprising:

a first step for initiating entry by a CPU contained in said television receiving apparatus in response to an initiating signal;

a second step for requesting from a user a number of the channel for data only, and for receiving the channel number for data only which has been input by the user;

a third step for selecting the channel for data only in accordance with the received channel number;

a fourth step for analyzing coded information on the selected channel and converting the coded information into a signal which can be processed by said CPU, said coded information including information representative of broadcast channel numbers and their corresponding station names;

a fifth step for writing the convened information including channel number to a memory located in said television signal receiving apparatus; and a sixth step for terminating said method when all of the coded information has been processed.

10. The method for entering information represented by an information signal according to claim 9, wherein;

said CPU reads the information written to memory in said fifth step, displays the information on a predetermined region of an entry screen and writes the channel number to an address corresponding to an entry location in the memory provided by the user.

* * * * *